US005564298A

United States Patent [19]

DeMeo

[11] Patent Number: 5,564,298

[45] Date of Patent: Oct. 15, 1996

[54] DIE TOOL AND PRESS MONITOR AND PRODUCT QUALITY ANALYSIS APPARATUS AND METHOD

[75] Inventor: Michael DeMeo, Troy, Ohio

[73] Assignee: Aluminum Company of America, Pittsburgh, Pa.

[21] Appl. No.: 333,108

[22] Filed: Nov. 1, 1994

[51] Int. Cl.$^{6}$ .............................. H01R 43/04; B23P 19/00

[52] U.S. Cl. .............................. 72/19.8; 72/20.1; 72/20.4

[58] Field of Search .............................. 72/19.8, 21, 20, 72/12, 37, 20.1, 20.4

[56] References Cited

U.S. PATENT DOCUMENTS

| | | | |
|---|---|---|---|
| 4,408,471 | 10/1983 | Gossard et al. | 72/21 |
| 4,692,857 | 9/1987 | Chi | 72/21 |
| 4,945,742 | 8/1990 | Schoch | 72/21 |
| 5,027,631 | 7/1991 | Naito | 72/21 |
| 5,271,254 | 12/1993 | Gloe et al. | 72/19 |
| 5,423,199 | 6/1995 | Mangrulkar | 72/21 |

*Primary Examiner*—David Jones
*Attorney, Agent, or Firm*—Thomas R. Trempus

[57] ABSTRACT

A die tool wear monitor and analysis system identifies tooling wear, variations in the quality of the manufactured product, and undesired operational conditions within a press. A first signal indicates the angular position of a reciprocating ram and a second signal indicates the force differential present between the tooling components. The second signal is plotted relative to the first signal and defines a value of force differential for selected positions of the upper and lower tooling relative to each other. Preferred values consisting of at least one upper and one lower limit are established for each of the second signals with respect to each of the first signals. The second signal is compared to the established preferred values and when it falls beyond them, the manufacture part is ejected and/or the operation of the conversion press is terminated.

20 Claims, 4 Drawing Sheets

DIE TOOL AND PRESS MONITOR AND PRODUCT QUALITY ANALYSIS APPARATUS AND METHOD

FIELD OF THE INVENTION

The invention generally relates to the manufacture of can ends that are employed in the packaging in which beer and beverages as well as other food products are distributed and sold. More particularly, the invention provides a monitoring apparatus and method for use in combination with a conversion presses that forms easy open can ends and the like. The analysis system monitors die tool wear in the conversion press, press operations, and the quality of the converted product as it is indexed through the several tooling stations in the conversion process.

BACKGROUND OF THE INVENTION

Many metallic cans for holding beverages or other products are provided with easy-open can ends, wherein a pull tab attached to a tear strip that is defined by a score line in the can end may be pulled to provide an opening in the can end for dispensing the can's contents. Likewise, many food products are sold in metal containers that have ends designed to facilitate access to the contents without the use of can openers or the like.

By way of example, in the manufacture of an easy-open can end, a can end shell is first formed from a metal sheet product, preferably an aluminum sheet product. The can end shell is then conveyed to a conversion press. In the typical operation of a conversion press, a can end shell is introduced between an upper tool member and a lower tool member which are in the open, spaced apart position. A press ram advances the upper tool member toward the lower tool member in order to perform any of a variety of tooling operations such as rivet forming, paneling, scoring, embossing, tab securing, and final staking. After performing a tooling operation, the press ram retracts until the upper tool member and lower tool member are once again in the open, spaced apart position. The partially converted shell is transported to the next successive tooling operation until an easy-open can end is completely formed and discharged from the press. As one shell leaves a given tooling operation, another shell is introduced into or indexed into the vacated operation, thus continuously repeating the entire easy-open can end manufacturing process. Conversion presses can operate at speeds that produce in excess of 500 can ends per minute. It has been the practice in the can end industry to maintain the metal gauge of the can end to a gauge of approximately 0.0108 to 0.0116 inch. As can be appreciated, the very nature of can end formation requires a nearly continuous monitoring of the output of the press in order to maintain product quality and avoid situations in which the die tooling is subject to damaging misalignment or wear conditions that result in poor quality products. It is a goal of the conversion press industry to continue to strive toward the manufacture of can ends of both reduced diameter and reduced metal thickness in order to effect enhanced cost savings through the use of less metal in each packaged product. Likewise, it is another goal of the industry to maintain product quality at the highest rates of press operation and to minimize the loss of product due to undetected die wear and/or die failure.

It is therefore an object of this invention to provide a conversion die tooling wear, press operation, and product quality monitoring method and apparatus.

It is yet another object of this invention to provide a method and apparatus for identifying unacceptable part quality or conditions that could damage the conversion press during operation and to identify such parts or indicate the need to immediately stop the conversion press.

SUMMARY OF THE INVENTION

The die tool wear, press operation, and product quality monitoring system is employed in a conversion press for the manufacturer of can ends or similar products used in the packaging industry. In a conversion press, a reciprocating ram advances and retracts a first member having a first tooling component toward and away from a second member having a second tooling component. Typically, the second tooling component is mounted on a stationary tooling bed. A die tool wear monitor and analysis system provides a method for the identification of die wear in the tooling and for the identification of variations in the quality of the conversion press product as it is indexed through the various tooling stations within the conversion process. The die tool wear monitor and analysis system also identifies undesired alignment conditions within the conversion press itself.

According to the method of this invention, a first signal indicative of the angular position of the reciprocating ram through a predetermined range of travel is generated. Zero degrees indicates that the furthest withdrawal of the ram from the press bed and 180 degrees indicates the closest point of approach of the ram to the press bed. At least a second signal indicative of the force differential present between the first tooling component and the second tooling component is generated. The second signal is plotted relative to the first signal that identifies the position of the reciprocating ram in order to define a value of force differential for each selected position of the upper and lower tooling relative to each other.

Preferred values consisting of at least one upper and one lower limit are established for each of the second signals with respect to each of the first signals along the predetermined range of travel of the ram. Thus for every selected angular position of the ram as it approaches 180 degrees and recedes from that position, a value is generated by a signal indicative of the force measured between the first and second tooling components. The plotted second signal is compared to the established preferred values. When the plotted value falls beyond the established preferred values, means are provided to affect either the ejection of a part not within quality standards at the completion of the conversion process or an emergency stop signal that terminates press operation.

This invention monitors tooling components and manufactured products at critical stages of a conversion process. This invention maintains a history of press operation and part production. In addition to monitoring the conversion process, nonconforming parts are rejected and the conversion press stopped if the analysis indicates that continued operation could cause serious die or press damage. The invention provides for the use of force measurement means mounted in the die tool bed for generating signals indicative of the force present in the die tool bed. Computer means are in communication with the force measurement means in order to provide the analysis required to affect the method of this invention.

BRIEF DESCRIPTION OF THE DRAWINGS

The above as well as other features and advantages of the invention can be appreciated through consideration of the detailed description in conjunction with the following figures in which.

DETAILED DESCRIPTION OF THE INVENTION

Figure 1:
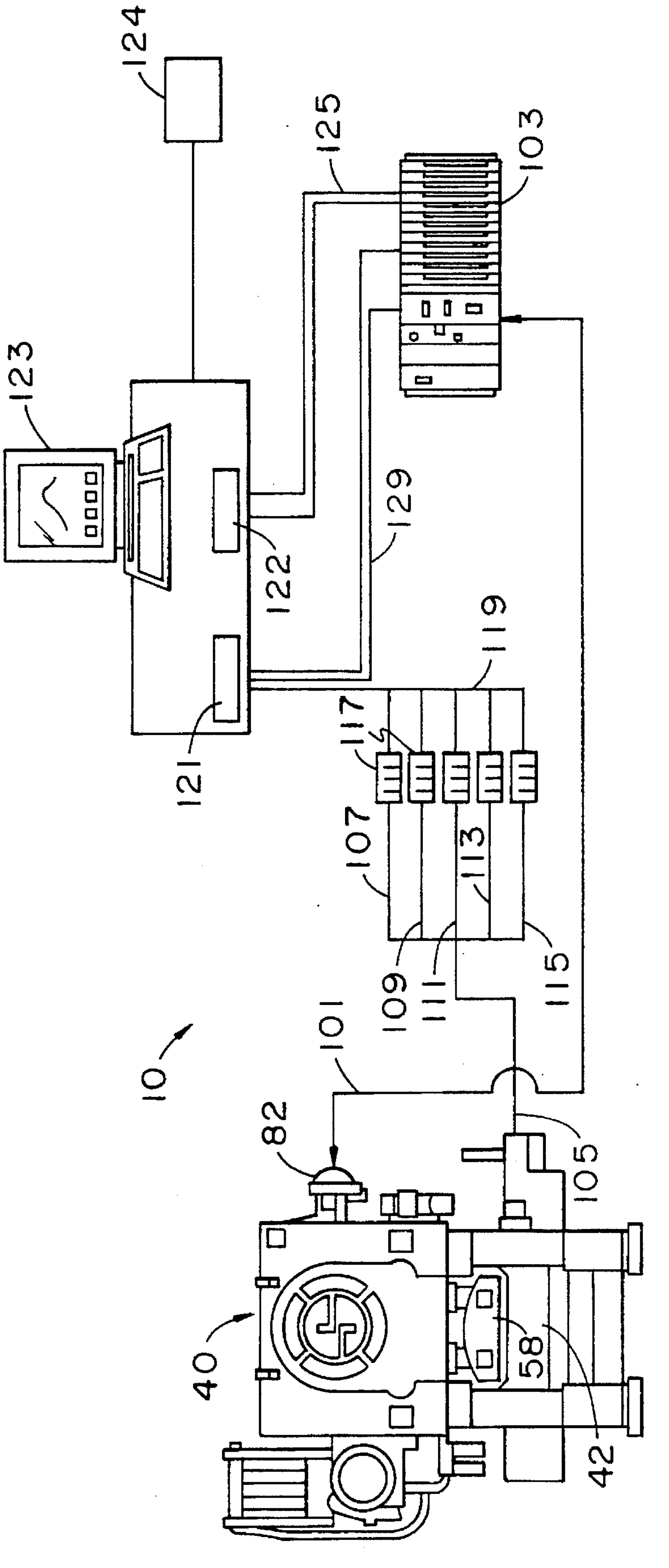
FIG. 1 is a schematic drawing of the die tool wear analysis and part quality monitoring system.

Turning to FIG. 1, a schematic illustration of the die tool wear analysis and part quality monitoring system of this invention is generally indicated by the reference character 10. The die tool wear analysis and product quality monitoring system can be employed in a conversion press 40 for the manufacturer of can ends or the like. While the invention is described in connection with an easy open can end conversion press, it is to be understood that the apparatus and method of this invention can be applied to conversion press for the production of similar articles of manufacture. In the manufacture of an easy open can end, a can end shell is indexed through the several tooling stations of a conversion press.

Figure 2:
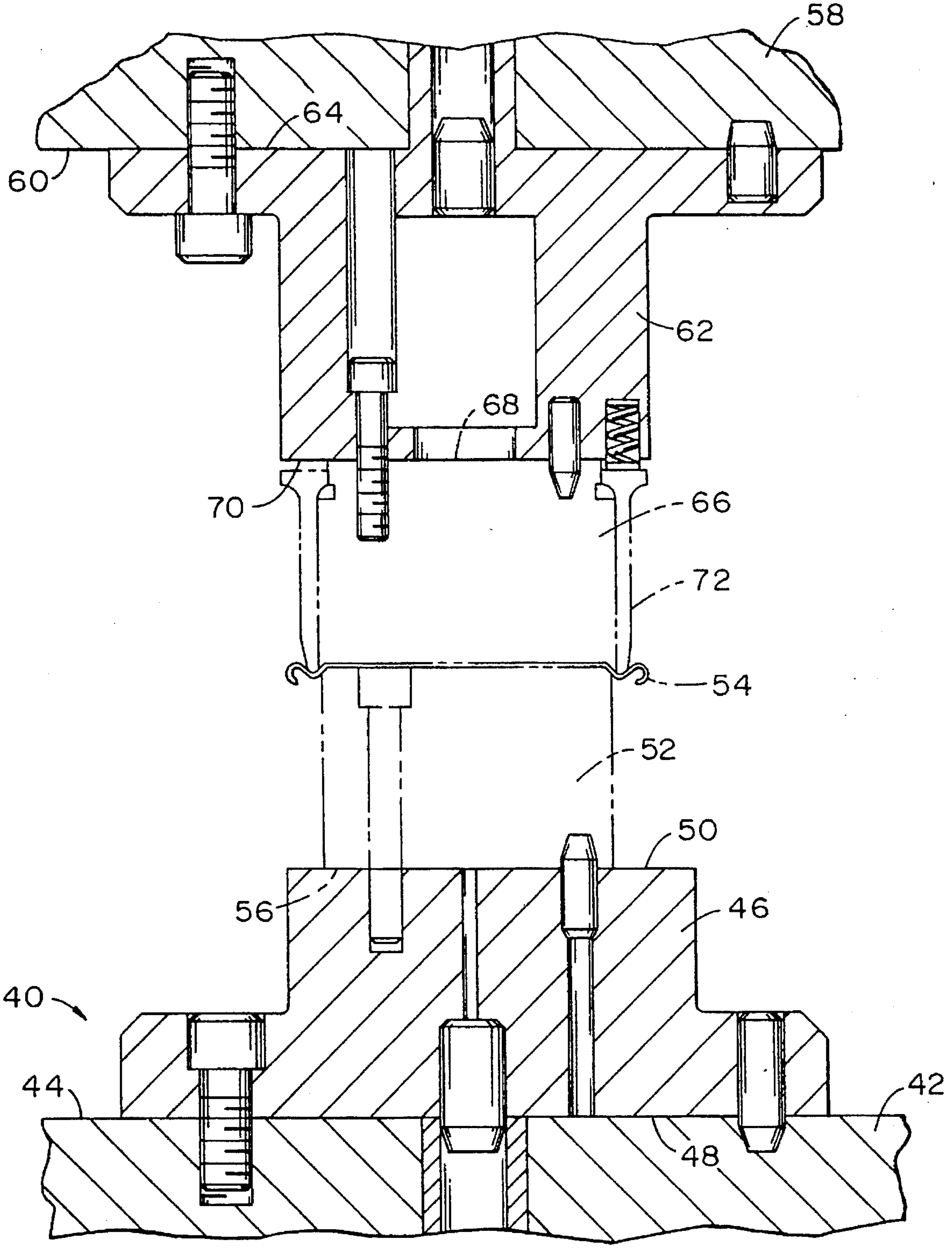
FIG. 2 is a cross sectional side view illustrating the press ram, tool support means, ram, upper and lower tool members, a support base and a stationary press bed.

The manufacture of a can end shell into an easy-open can end takes place in a conversion press, a portion of which is shown in FIG. 2. The Minster Machine Company of Minster, Ohio manufactures and sells an industrial press suitable for configuration as a can end conversion press. The conversion press 40 generally includes a stationary press bed 42 that has a generally planar horizontal upper surface 44. The upper surface supports a tooling base 46 which has a planar bottom surface 48 and a planar upper surface 50. Positioned upon the upper surface of tooling base is a lower tooling member 52 (shown in phantom) which may take a variety of shapes depending upon the tooling operation to be performed on the can end shell 54. However, each lower tooling member 52 has a planar bottom surface 56 which mates with the upper surface 50 of the tooling base 46 to provide secure support for the lower tooling member 52.

A vertically displaceable press ram 58 overlies press bed and includes a generally planar horizontal lower surface 60. This surface 60 of the press ram 58 supports a tool support means 62 which may take a plurality of shapes depending upon the type selected for a particular tooling operation. In general, however, the tooling support means or base 62 includes an upper planar surface 64 which provides solid mating contact with the surface 60 of the press ram 58 so that the tooling support means 62 is securely fastened to the press ram. The tool support means 62 securely supports an upper tooling member (shown in phantom) 66 having an upper planar surface 68 that is in mating contact with the lower planar surface 70 of the tool support means 62. The upper tooling member 66 can be one of many shapes and sizes depending upon the particular tooling operation to be performed. Typically, a centering ring 72 locates the can end shell 54 in each tooling station.

As shown in FIG. 2, the can end shell is introduced between an upper tool member and a lower tool member which are in the open spaced apart position. The press ram 58 advances the upper tool member toward the lower tool member in order to perform any of a variety of tooling operations such as rivet forming, paneling, scoring, embossing, tab securing and final staking. Additionally, separate tooling is typically provided that works in conjunction with the main conversion tooling described above to produce the tab that is staked onto an integral rivet formed in the can end. After performing a tooling operation, the press ram 58 retracts from the lower press bed 42 until the upper tool member and lower tool member are once again in the open, spaced apart position. The partially converted shell 54 is transported to the next following tooling operation whereupon the press ram advances the upper tooling member toward the lower tooling member This operation of advancing and retreating the upper tooling member and sequentially advancing the converted shell from one tooling station to the next successive tooling station continues until an easy open end is completely formed and discharged from the press. Generally, the complete manufacturing process for the conversion of a can shell into a converted can end takes place in eight successive tooling stations. It is known to produce a converted can end in less than eight stations and it is no doubt possible to use more than eight stations depending of course upon the specific features to be incorporated into the can end. The tooling stations are arranged in lanes and a belt advances the can end shell through each tooling station in a particular lane. The assignee of the present invention designs and manufactures conversion presses that have either two lanes or three lanes of tooling so that for each stroke of the press, two or three can ends are simultaneously worked by the tooling. A single conversion press with three lanes of tooling can produce approximately 1800 fully converted can ends per minute. At this rate of production, a conversion press with tooling die irregularities could produce 100,000 defective can ends, i.e., scrap metal, in a single hour of substandard operation. A more complete understanding of the operation of a conversion press is available by a review of U.S. Pat. No. 4,610,156, "Progressive Die Apparatus Having Resilient Tool Support Means", which is assigned to the assignee of the instant invention and which is incorporated herein by reference as if fully set forth.

The conversion press 40 includes a variety of belt driven components such as at which in part index the converted can ends through the tooling stations. The indexing of parts is coordinated with the reciprocating movement of the ram press. A conventional resolver 82 is in communication with the ram press so as to generate a signal indicative of the angular location of the press ram 58 as it advances and retreats toward and away from the press bed 42. In its highest position or the position furthest from the press bed, the angular position of the ram is zero and the output of the resolver indicates the same. When the ram advances and is in its lowest position, closest to the press bed, the ram is at the 180 degree position of its travel.

Figure 3:
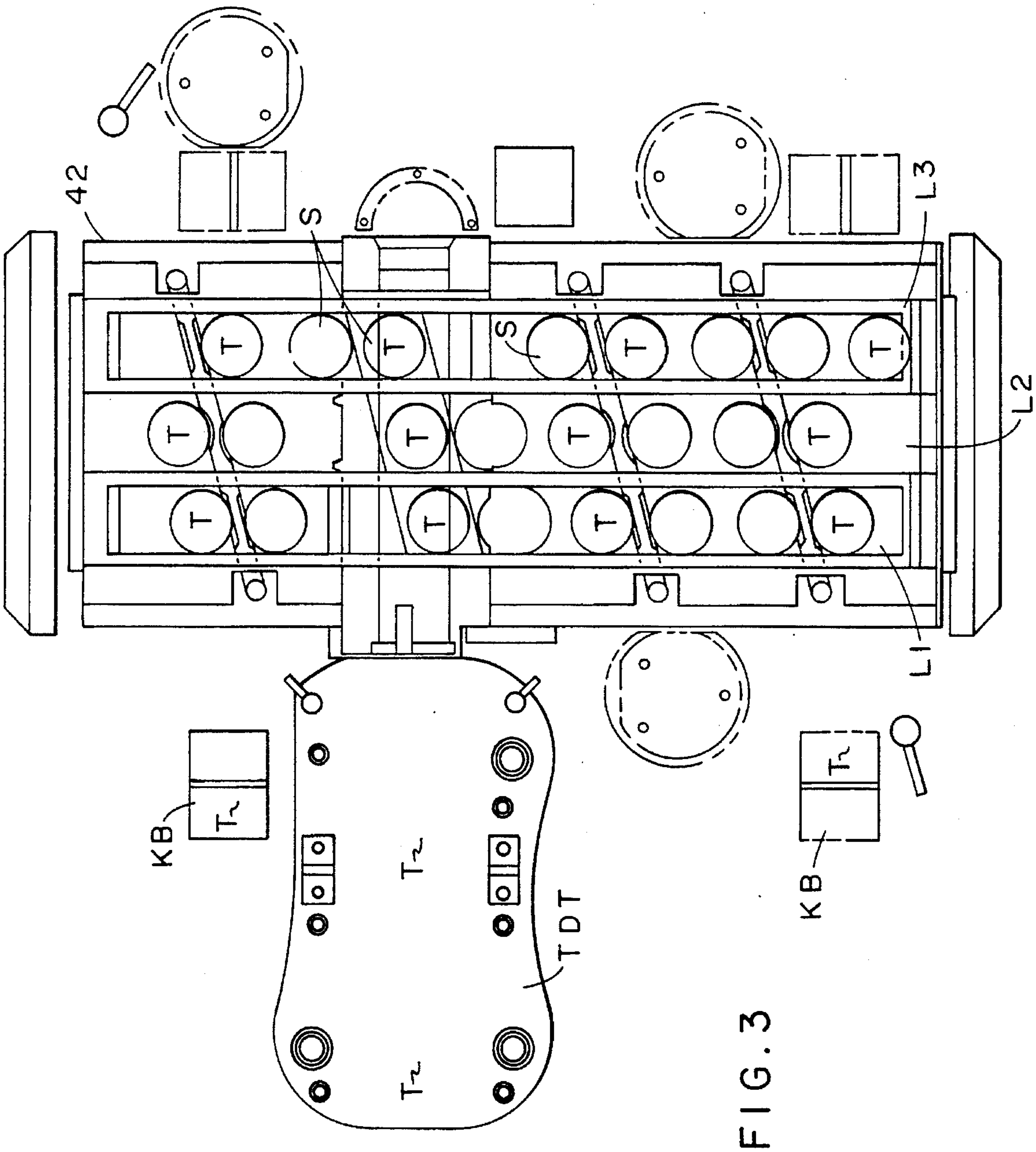
FIG. 3 is a schematic drawing of a typical die tool bed layout illustrating the several tooling stations in the conversion process and preferred locations of the force measurement and signal generating transducer means.

A schematical representation of the stationary die tool bed 42 is shown in FIG. 3. This embodiment of the tool die bed 42 includes three lanes of tooling, L1, L2, and L3, each of which consists of eight separate tooling stations schematically indicated by the circular members, some of which are designated "S". In a conversion press, a second set of tooling manufactures the tab that is operated by the consumer to open the can end. This second set of tooling is the tab die tooling, "TDT" and typically consists of three lanes of tooling each having multiple stations in which the tab is formed from a continuous strip of metal. Several force transducers are located in critical tooling stations of the conversion process. These transducers are indicated by the reference character "T". It has been found that quartz crystal transducers are particularly well suited for this application. Quartz force transducers measure dynamic and quasi static forces from a few N up to 1.2 MN. Suitable force transducers for use in accordance with the instant invention are commercially available from Kistler Instrument Corporation, Amherst, N.Y. While it is to be appreciated that the force transducers "T" can be located in any number of locations in the press bed, in a preferred embodiment, transducers are located as shown. Three transducers "T" are situated proximate the bubble formation tooling station, three transducers are proximate the scoring tooling station, three transducers are proximate the rivet staking station, and three transducers are proximate the wipe station or final tooling station. Additionally, two transducers "T" are located in the conversion press "kiss blocks" designated at "KB" and two more are disposed in the tab formation dies "TDT". The techniques employed in the mounting of a force transducer are known to those skilled in the application of them and is only briefly mentioned herein. Generally, to mount a transducer, a seat is milled or formed in the desired location. Suitable channels or bores are also provided to permit the electrical connection of the transducer. The transducer is placed in the seat and the electrical leads exit the tooling bed by means of the channel or bore.

Two output signals from the conversion press are monitored. The first signal, as described above, is from the conversion press resolver and indicates the angular position of the press ram, and as a result, the relative distance between the tooling die halves can be calculated. The resolver output 101 is typically monitored by the standard press controller 103. The press controller 103 communicates operator instructions, such as the warm up, initiation, and termination of press operations, to the press drive system. The second signal 105 is in fact the several individual outputs that are generated by the sixteen force transducers "T" disposed in the tooling plate, and conversion press bed kiss blocks. The outputs of the three transducers "T" situated proximate the bubble formation tooling station are indicated at 107, the outputs of the three transducers proximate the scoring tooling station are indicated at 109, the outputs of the three transducers proximate the rivet staking station are indicated at 111, and the outputs of the three transducers proximate the wipe station is indicated at 113. Additionally, the outputs of the transducers "T" located in the conversion press "kiss blocks" and in the tab formation dies are indicated at 115. Each of the quartz force transducers "T" generates an electrical output indicative of the dynamic force and quasistatic force present as the press ram advances and retreats relative to the die tool bed. The sixteen transducers generate sixteen separate outputs, i.e., 107 through 115 that are transmitted to charge amplifiers generally indicated by the reference character 117. The output 119 of each of the charge amplifiers is processed by a microprocessor 121 which is also in communication as at 129 with the standard press controller 103. Preferably, in view of currently available technology, I have found that the microprocessor 121 can be a 486, 66DX2, DOS based machine. In my preferred embodiment, a second microprocessor 122 receives the press operational and control information and then compares it with programmed die wear information as described elsewhere herein. Additionally, the co-processor 122 functions as an alarm co-processor in the event that press operations are not within a predefined range of acceptable variances. The microprocessors 121 and 122 may be in communication with a video monitor and a printer 123 and 124 for the presentation of a graphic display of, for example, the relationship of the resolver output signal and the force transducer signals.

In the preferred embodiment, the sampling of the output of each force transducer means "T" is initiated when the angular position of the press ram is at 155 degrees in its advance toward the stationary bed. The sampling is terminated when the press ram retreats to an angular position of 205 degrees relative to the press bed. In this arrangement, for each degree of travel of the press between the range of 155 degrees and 205 degrees, the output of each of the sixteen force transducers is monitored. This preferred arrangement provides 25 individual signal samples from each sensor during the down stroke and 25 signal samples from each sensor during the return stroke, or a total of 800 data points during a single stroke of the press. I have determined that it is advantageous to provide at least 20 degrees of monitoring in each direction of press movement as a minimum. This "minimum monitoring" arrangement monitors the transducer output between 160 degrees and 185 degrees. However as described above, it is preferred that signals be taken through a more extended range of press movement. Thus, as individual tooling components in the die tool bed begin to wear or experience any misalignment, the resulting change to the tooling creates a difference in the overall measurable force detected by the transducers. This change in the force generated in the tooling is reflected in the output of the force transducer at various angular locations of the press ram.

In normal operation as defined by the production of quality converted can ends produced within the acceptable manufacturing tolerances, a base line for the operation of the conversion press is established. This base line is available as a standard for use in the set up of additional machines utilizing the same style of dies. The tool die wear monitor and part quality analysis of this invention monitors press operation against this base line to detect abnormalities or unacceptable conditions during operations. The manufactured part itself is not subject to individual analysis. Rather, the condition of the manufactured part is deduced by comparing the output of the conversion press mounted transducers against the base line. For example, once the force necessary to score a can end is established, variations in that measured force are monitored and compared to the quality of the end product. In this manner, the range of acceptable manufacturing conditions is statistically established. Variations in the monitored forces beyond the acceptable range can be viewed as indicators of a part not manufactured within acceptable tolerances.

The die tool wear analysis concept of this invention provides for a first set of upper and lower limits and asecond set of upper and lower limits. A variance of the base output of the force transducers during the monitoring period beyond the first and second set of upper and lower limits results in either the ejection of a part not manufactured within quality standards or the complete shutdown or emergency stop of the conversion press, respectively. It should be appreciated that at each work station associated with a force transducer, the transducer produces a signal indicative of the force present at that work station. This measured force is in fact the sum of the work being done at that station. Each station may have one or more work operations performed on the can end shell. Typically several operations are being performed on the can end at each station. For example, the tab or ear wipe station may also include incising in which recycling information or manufacturing information is also incised onto the can end panel.

Figure 4:
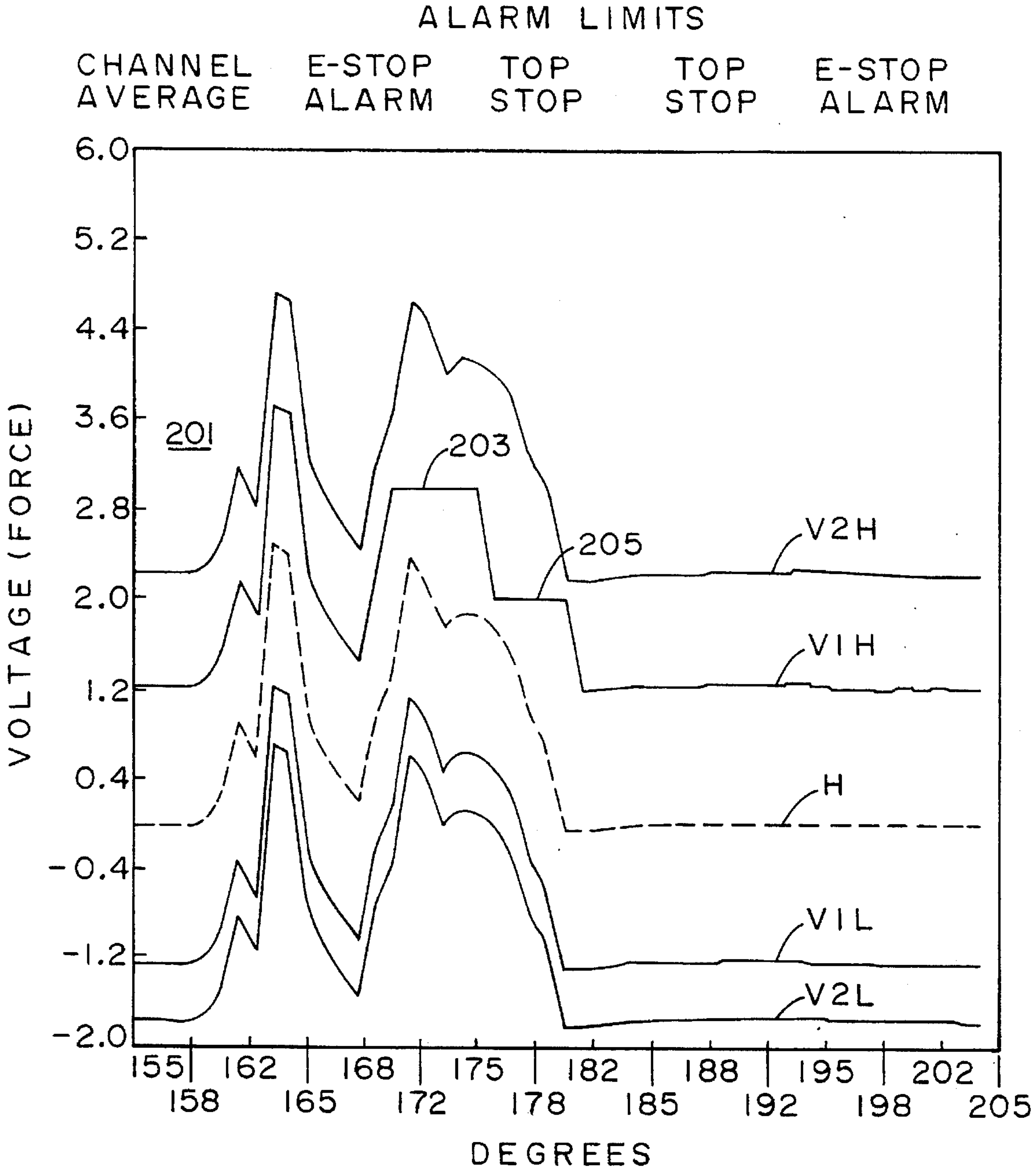
FIG. 4 is representation of a graph illustrating the typical die tool wear analysis output, and including upper and lower emergency conversion press stop and part ejection limits.

Turning now to FIG. 4, the chart illustrates exemplars of two sets of upper and lower limits as well as the hypothetical output of a single transducer through the course of one cycle of the ram press. The output from the single transducer shown in this illustration is indicated at reference character "H". The first set of limits is established and indicated at V1H and V1L. This first set of limits for intermediate limits are indicators of tool die wear and by deduction, product quality. The second set of limits for outer limits V2H and V2L reflect serious nonconforming parts and the possibility of damage to the tooling or press if operation is continued. As can be seen from this graph, the limits can be established to vary consistently with the output H along the entire 50 degrees of monitored travel as shown generally at the reference character "201". Because the limits can be set at each degree, there need not be a uniform variance from normal operation to trigger abnormal wear or a dangerous condition. In fact, variations in tooling wear at one station, such as the staking station may be more tolerable than variations in another station such as the scoring station. Moreover, force output signals at a specific location of the press ram cycle may be more critical at one tooling station as compared to another. Accordingly, the present invention provides a method of monitoring that contemplates the need for a high degree of customization. As shown at reference character "203", the upper wear indicator signal V1H is maintained at a plateau of approximately three (3) volts through the travel of 170 degrees through 175 degrees. Likewise an additional plateau is shown at reference character "205". However, the remainder of the wear signal V1H is shown to be set at a variance of 25% above the preferred hypothetical output. Similarly, the lower tool wear indicator V1L is set at 25% of the base line. Upper signal V2H is set at 45% while lower emergency stop signal V2L is shown at 35%. It is to be appreciated that while these limits can be set to be a uniform value, the process contemplates the likelihood of using individual settings to optimize the die tool wear and product quality analysis process of this invention.

If the plotted signal indicative of the force at a given degree of travel of the ram is not within acceptable limits, an output signal as at 125 from the co-processor 122 can trigger the press controller 103 to effect an emergency stop of the conversion press 40. In less extreme variations of the plotted signal, the output 125 can alternatively trigger by means of the press controller 103, a part ejector means (not shown). The part ejector means is incorporated into the conversion press 40 and is adapted to selectively remove defective products from the output of the conversion press.

What has been described is a method and an apparatus particularly well suited for the monitoring of die tooling wear in a conversion press, the monitoring of press operations, and for monitoring manufactured part quality through the analysis of tooling wear. It is to be appreciated that having described the presently preferred embodiments, it is to be understood that the invention may be otherwise embodied within the scope of the appended claims Having described the invention, what is claimed is:

1. A method for detecting tooling wear in a can end conversion press for the manufacture of converted ends in which a reciprocating ram advances and retracts a first tooling component toward and away from a second tooling component mounted upon a stationary tooling bed, said tooling components including multiple, cooperating tooling stations, said method comprising the steps of:

(a) generating a first signal indicative of the an angular position of the reciprocating ram through a predetermined range of travel wherein zero degrees indicates the furthest withdrawal of the ram from the press bed and 180 degrees indicates the closest point of approach of the ram to the press bed;

(b) generating multiple second signals at separate tooling stations indicative of a force differential between the first tooling component and the second tooling component;

(c) plotting said second signals relative to said first signal for the predetermined range of travel of the reciprocating ram in order to define a value of force differential for each said second signal;

(d) establishing preferred deferential values consisting of a least one upper and one lower limit for each said second signal with respect to each of said first signals along the predetermined range of travel of said ram;

(e) comparing said plotted second signals to said established preferred differential values; and (f) generating an output signal indicative of said compared, plotted second signals at least when said plotted second signals fall at or beyond said established preferred differential values.

2. The method according to claim 1 including the step of providing multiple means in the stationary tooling bed for generating the multiple second signals and further providing means in the conversion press responsive to the output signal indicative of the compared, plotted second signals.

3. The method according to claim 2 wherein the means in the conversion press responsive to the output signal indicative of the compared, plotted second signals includes means for effecting the operation of the conversion press operation.

4. The method according to claim 1 wherein the at least one upper and one lower limit for each second signal with respect to each first signal along the predetermined range of travel of the ram are selected as indicators of tool die wear.

5. The method according to claim 1 wherein the step of establishing preferred deferential values consisting of at least one upper and one lower limit for each of the second signals with respect to each of the first signals along the predetermined range of travel of the ram, includes the step of establishing a second upper and a second lower limit for each of the second signals with respect to each of the first signals along the predetermined range of travel of the ram.

6. The method according to claim 5 wherein the second upper and second lower limits for each of the second signals with respect to each of the first signals along the predetermined range of travel of the ram are selected as indicators of potentially damaging press operation.

7. The method according to claim 6 including the step of providing means in the conversion press for terminating the operation of the conversion press, said means being responsive to the output signal indicative of the compared, plotted second signal second upper and second lower limits.

8. A method for monitoring manufactured product quality through detecting tooling wear in a can end conversion press for the manufacture of said product in which a reciprocating ram advances and retracts a first tooling component toward and away from a second tooling component mounted upon a stationary tooling bed, said tooling components including multiple, cooperating tooling stations, said method comprising the steps of:

(a) generating a first signal indicative of the an angular position of the reciprocating ram through a predetermined range of travel wherein zero degrees indicates the furthest withdrawal of the ram from the press bed and 180 degrees indicates the closest point of approach of the ram to the press bed;

(b) generating multiple second signals at separate tooling stations indicative of a force differential between the first tooling component and the second tooling component;

(c) plotting said second signals relative to said first signal for the predetermined range of travel of the reciprocating ram in order to define a value of force differential for each said second signal;

(d) establishing preferred deferential values consisting of a least one upper and one lower limit for each said second signal with respect to each of said first signals along the predetermined range of travel of said ram;

(e) comparing said plotted second signals to said established preferred differential values; and (f) generating an output signal indicative of said compared, plotted second signals at least when said plotted second signals fall at or beyond said established preferred differential values.

9. The method for monitoring manufactured product quality according to claim 8 including the step of providing means in the stationary tooling bed for generating the multiple second signals and further providing means in the conversion press responsive to the output signal indicative of the compared, plotted second signals.

10. The method according to claim 9 wherein the means in the conversion press responsive to the output signal indicative of the compared, plotted second signals effect the differentiation of the manufactured product.

11. The method according to claim 10 wherein the at least one upper and one lower limit for each of the second signals with respect to each of the first signals along the predetermined range of travel of the ram are selected as indicators of the quality of the manufactured product.

12. The method according to claim 8 wherein the step of establishing preferred deferential values consisting of at least one upper and one lower limit for each of the second signals with respect to each of the first signals along the predetermined range of travel of the ram, includes the step of establishing a second upper and a second lower limit for each of the second signals with respect to each of the first signals along the predetermined range of travel of the ram.

13. The method according to claim 12 wherein the second upper and second lower limits for each of the second signals with respect to each of the first signals along the predetermined range of travel of the ram are selected as indicators of potentially damaging press operation.

14. The method according to claim 13 including the step of providing means in the conversion press for terminating the operation of the conversion press, said means being responsive to the output signal indicative of the compared, plotted second signal second upper and second lower limits.

15. In combination with a conversion press for the manufacture of products in which a reciprocating ram advances and retracts a first tooling component toward and away from a second tooling component mounted upon a stationary tooling bed, said tooling components including multiple, cooperating tooling stations, an apparatus for identifying wear in the tooling and/or degradation of the quality of the products during the manufacturing process comprising:

(a) means for generating a first signal indicative of the an angular position of the reciprocating ram through a predetermined range of travel wherein zero degrees indicates the furthest withdrawal of the ram from the press bed and 180 degrees indicates the closest point of approach of the ram to the press bed;

(b) means for generating multiple second signals at separate tooling stations indicative of a force differential between the first tooling component and the second tooling component;

(c) means for plotting said second signals relative to said first signal for the predetermined range of travel of the reciprocating ram in order to define a value of force differential for said second signal;

(d) means for establishing preferred deferential values consisting of a least one upper and one lower limit for said second signal with respect to each of said first signals along the predetermined range of travel of said ram;

(e) means for comparing said plotted second signals to said established preferred differential values; and (f) means for generating an output signal indicative of said compared, plotted second signals at least when said plotted second signal falls at or beyond said established preferred differential values.

16. The combination of claim 15 including multiple means in the stationary tooling bed for generating the second signals and means responsive to the output signal indicative of the compared, plotted second signal operatively associated with the conversion press.

17. The combination of claim 16 wherein the means in the conversion press responsive to the output signal indicative of the compared, plotted second signals further includes means for effecting the operation of the conversion press operation.

18. The combination according to claim 15 wherein the at least one upper and one lower limit for each of the second signals with respect to each of the first signals along the predetermined range of travel of the ram are selected as indicators of tool die wear and/or degradation of the quality of the products.

19. The combination according to claim 15 wherein the means for establishing preferred deferential values consisting of at least one upper and one lower limit for each of the second signals with respect to each of the first signals along the predetermined range of travel of the ram, further includes a second upper and a second lower limit for each of the second signals with respect to each of the first signals along the predetermined range of travel of the ram.

20. The combination according to claim 19 wherein the second upper and second lower limits for each of the second signals with respect to each of the first signals along the predetermined range of travel of the ram are indicators of potentially damaging press operation and said combination includes means in the conversion press for terminating the operation of the conversion press, said means being responsive to the output signal indicative of the compared, plotted second signal second upper and second lower limits.

* * * * *